United States Patent
Heninger et al.

(10) Patent No.: US 6,470,349 B1
(45) Date of Patent: Oct. 22, 2002

(54) SERVER-SIDE SCRIPTING LANGUAGE AND PROGRAMMING TOOL

(75) Inventors: Troy Heninger, South Ogden, UT (US); Rama Rasmussen, Ogden, UT (US)

(73) Assignee: Browz, Inc., Salt Lake City, UT (US)

( * ) Notice: Subject to any disclaimer, the term of this patent is extended or adjusted under 35 U.S.C. 154(b) by 0 days.

(21) Appl. No.: 09/266,357

(22) Filed: Mar. 11, 1999

(51) Int. Cl.$^7$ .............................................. G06F 17/00
(52) U.S. Cl. ........................ 707/102; 707/513; 717/143
(58) Field of Search ............. 707/1–529; 709/100–322; 345/716–749; 717/143

(56) References Cited

U.S. PATENT DOCUMENTS

| | | | |
|---|---|---|---|
| 5,530,852 A | 6/1996 | Meske, Jr. et al. ......... 395/600 |
| 5,537,586 A | 7/1996 | Amram et al. ............. 395/600 |
| 5,708,825 A | 1/1998 | Sotomayor ................ 395/762 |
| 5,708,826 A | 1/1998 | Ikeda et al. ................ 395/762 |
| 5,727,156 A | 3/1998 | Herr-Hoyman et al. ....... 395/200.49 |
| 5,737,592 A | 4/1998 | Nguyen et al. ............. 395/604 |
| 5,748,188 A | 5/1998 | Hu et al. .................... 345/326 |
| 5,761,673 A | 6/1998 | Bookman et al. ........... 707/104 |
| 5,812,134 A | 9/1998 | Pooser et al. .............. 345/356 |
| 5,890,170 A | * 3/1999 | Sidana .................... 707/501.1 |
| 5,898,835 A | * 4/1999 | Truong .................... 709/217 |
| 5,963,952 A | * 10/1999 | Smith ..................... 707/102 |
| 5,987,523 A | * 11/1999 | Hind et al. ................ 709/245 |
| 6,073,160 A | * 6/2000 | Grantham et al. .......... 709/200 |
| 6,119,166 A | * 9/2000 | Bergman et al. ........... 709/232 |
| 6,178,439 B1 | * 1/2001 | Feit ........................ 709/204 |

* cited by examiner

*Primary Examiner*—David Jung
(74) *Attorney, Agent, or Firm*—Kirton & McConkie; Michael F. Krieger

(57) ABSTRACT

Software loads script file and strips markup language tags. This software can be located on a server. In order to prepare for operation, markup language pages are created. Then, special tags containing script commands are placed in the pages. These tags are replaced dynamically with the result of the command execution when the script is requested by a browser and executed by the server.

1 Claim, 11 Drawing Sheets

SERVER-SIDE SCRIPTING LANGUAGE AND PROGRAMMING TOOL

BACKGROUND OF THE INVENTION

1. The Field of the Invention

The present invention relates generally to the field of dynamic computer document creation and file serving. In particular, the present invention relates to a scripting language and method of use which provides for the use of inventive script codes in a document formatted for an independent application. The present invention is particularly well suited for creating dynamic HTML documents with database information using inventive scripting commands.

2. The Relevant Technology

The Internet is a world-wide network of computers which is now accessible to almost any potential user with a computer and a means for network access. Hundreds of Internet Service Providers (ISP's) have emerged to provide Internet access to millions of users who now use the Internet for personal and business communications, information retrieval, advertising, publishing, sales and document delivery.

In order to better implement many of these applications, the World Wide Web (WWW or Web), was created. The Web allows access to information and documents using "hypermedia" or "hypertext" links embedded into the document. This linking system allows documents to be accessed and linked in a "non-linear" fashion. Non-linear access allows a user to "jump" from one point in a document to another simply by selecting the link. It also allows jumping from one document to another whether the documents are on the same computer or across the world. Documents available on the WWW include text, sound, graphics images and even full-motion video.

Hypertext Markup Language (HTML), a specialized document formatting language, is typically used to create and format documents for viewing and linking on the Web. HTML uses special tags or codes embedded into a text document that format the document and allow linking to other documents or other locations in the same document. These links may also access files, such as sound files or graphics files which are played or displayed upon selection of a link. A document in HTML format that is available on the Web is typically referred to as a "Web page" or "Web site."

The WWW also implements a unique addressing system which allocates an address or Uniform Resource Locator (URL) for each document on the Web so that Web documents may be selectively accessed, sorted and indexed.

A computer with a dedicated connection to the Internet and specialized server software that enables Web access is called a "Web server." Web documents are located on storage devices connected to Web servers. A person seeking access to a Web page uses a computer with "Web browser" software which allows access to specified URL's as well as searching and other functions.

Generally, when a user accesses a specific Web page, the user enters the URL of the desired Web page into a computer which is running browser software. The browser software, then, sends a request across the internet to the server at the destination designated by the URL. The destination server will then send an electronic copy of the desired document to the browser computer where it can be displayed to the user. This is the typical procedure used for static Web pages that exist as unchanging files on a server storage device.

Web pages may also exist as dynamic documents that change or update themselves when conditions are met. Dynamic documents may update themselves each time they are accessed. This is achieved by allowing the server to execute a program when a given URL is accessed.

A current standard for enabling dynamic pages is the Common Gateway Interface (CGI) which allows a server to run programs which can change, update or customize the web page as it is being accessed.

Programs which reside on the server and are invoked by requests from client browser applications are referred to as "server side" programs. After these programs are run and the page is modified thereby, the newly modified "dynamic" page is sent to the browser which requested the page so it can be displayed to the user.

Another method for providing a dynamic Web page employs programs which are not operating system specific. These programs can be executed on any operating system supported by the programming language. One very popular example is the Java programming language created by Sun Microsystems, Inc. With Java, a programmer can create programs and include them in her web site where the programs will run when the site is accessed by other computers on the Web. The programs will run whether the accessing computer uses an operating system identical to that of the Web site or another operating system supported by Java. Java programs which are embedded in a site and executed by the accessing computer are called "applets." Java programs which are executed by the site server when the site is accessed by another computer are called "servlets" or more generically, "server side programs." A specialized programming language which operates exclusively with scripts interpreted by server side programs may be referred to as a "server side scripting language."

CGI and other dynamically enabled servers can allow dynamic pages to access date or time information, weather information, files with pricing or inventory data or other web pages. They may also allow access to databases stored on the same server or at another location on the Internet or a local network. This capability greatly enhances the utility of web pages and allows access to databases containing huge quantities of information.

SUMMARY AND OBJECTS OF THE INVENTION

The present invention is a server side scripting language and programming tool designed to simplify programming for web pages using databases or other dynamic information. The present invention is implemented by adding inventive script to a normal text-based document, such as an HTML document, a spreadsheet, a word processing document or any other text-based document which can benefit from a dynamic document architecture. The document is subsequently processed by the interpreter of the present invention to access database or other information when the document is requested by a browser or at some other time or interval specified by the programmer.

When a browser requests a document enhanced by the present invention, the interpreter processes the document by scanning for the inventive script commands. When a script command is encountered, the interpreter executes the script command, typically by retrieving or processing database information, returns the result to the web page and strips the executable script command from the resulting "pure-format"

document. Once all executable script commands have been executed and stripped, the resulting document is in a "pure-format" form. In the case of a typical web page, the "pure-format" form would be a pure HTML document containing no extraneous tags or commands. This "pure-format" document is, then, sent by the server to the client computer whose browser initiated the document request.

Due to the text-based format of the present invention, the novel script commands may be added, deleted or edited from a typical HTML or Web page editor or from a word processor or text editor.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
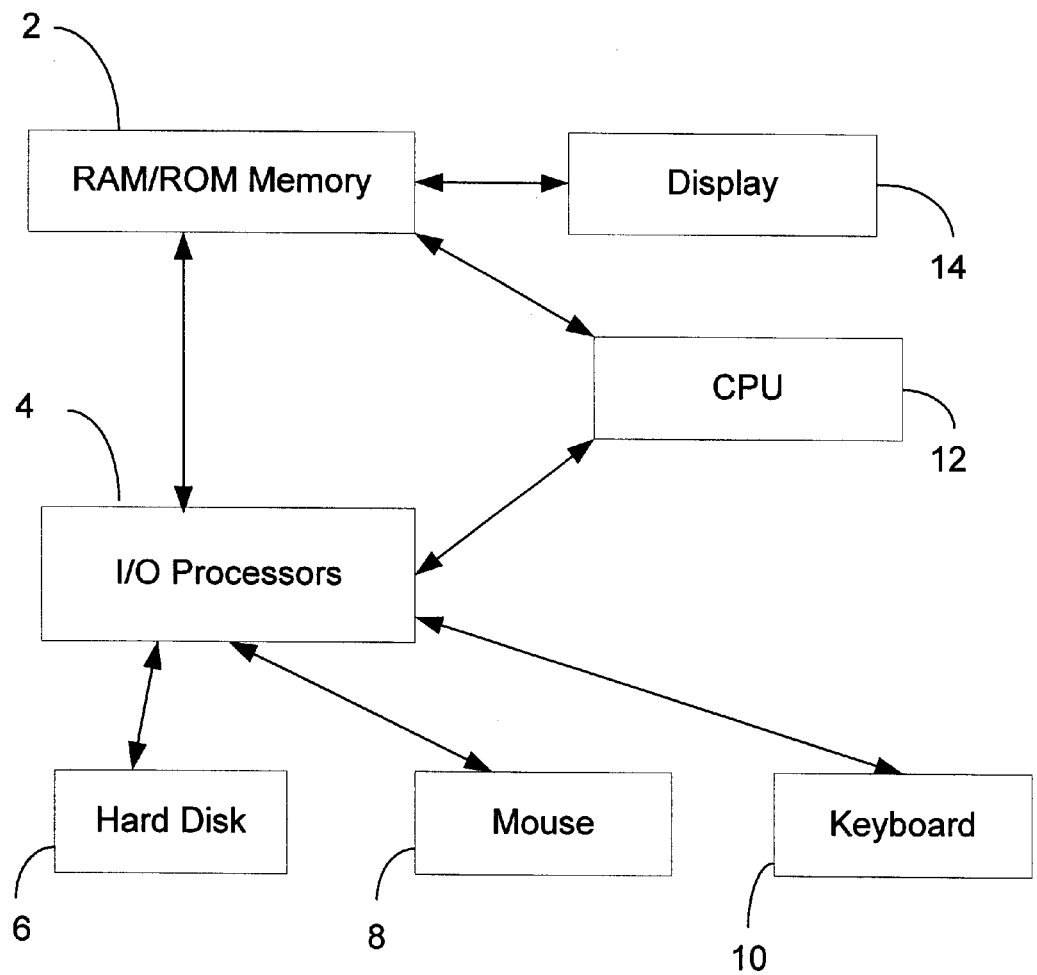
FIG. 1 is a computer hardware diagram of prior art computer as used in the implementation of a preferred embodiment of the present invention.

The figures listed above are expressly incorporated as part of this detailed description.

It will be readily understood that the components of the present invention, as generally described and illustrated in the Figures herein, could be arranged and designed in a wide variety of different configurations. Thus, the following more detailed description of the embodiments of the system and apparatus of the present invention, as represented in FIGS. 1 through 11, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

The preferred embodiment of the present invention is a server side scripting language and programming tool which greatly simplifies programming of many types of Web pages including Web database applications.

The first step in using the preferred embodiment of the present invention is to create an initial HTML document with the desired structure, layout and format defined by HTML code. After the initial HTML document is complete, the inventive commands of the scripting language of the preferred embodiment of the present invention are added to the initial HTML document to transform the initial HTML document into a mixed-format scripted document. This mixed-format scripted document contains the HTML code of the initial HTML document combined with the inventive script commands of the preferred embodiment of the present invention. These inventive script commands, which are input by a programmer, contain commands which add functionality to the Web page being created. Some of these commands may implement procedures which are executed when the resulting Web page is accessed thereby creating a dynamic Web page.

The currently preferred embodiment of the present invention utilizes a Java servlet to interpret the novel script commands. Accordingly, the server must support servlets for this embodiment. Servlets may be supported natively or through the use of plug-in programs which are common in the industry. The majority of these plug-in programs require that a version of Java be installed on the server. The Java Runtime Environment (JRE) or the Java Development Kit (JDK) may be installed on the server to enable servlet support. The Java environment also provides compatibility with virtually all established operating systems in use today.

The presently preferred embodiment of the present invention is entirely contained within one or more files stored in a standard file system thereby eliminating the need for a bulky, cumbersome database for program operation and functionality. This structure can improve performance and eliminate the need for licensing of third party database technology.

This implementation may be quickly and easily employed for many applications, however, if more speed is required or if speed takes precedence over ease of implementation, another embodiment may be used which employs a server add-on using the Common Gateway Interface (CGI) standard or a server plug-in using the Internet Server Application Programming Interface—Dynamic Load Library (ISAPI—DLL) standard.

When the presently preferred embodiment of the present invention is used to provide database connectivity to Web pages or other documents, a Java Database Connectivity (JDBC) or Open Database Connectivity (ODBC) driver is utilized to communicate with the database. Currently, JDBC is the preferred driver as it provides better performance with the preferred software embodiment.

A preferred embodiment of the present invention generally utilizes computers in a network environment. These computers, as basically illustrated in FIG. 1 may be mainframes, mini-computers, micro-computers or other variations, however, the most commonly used variations will employ a central processing unit (CPU) 12, with RAM and/or ROM memory 2, a display device 14 such as a cathode ray tube (CRT), one or more input/output processors 4, a hard drive 6 or other mass storage device, a pointing device such as a keyboard 10 and various other peripherals or other devices.

Figure 2:
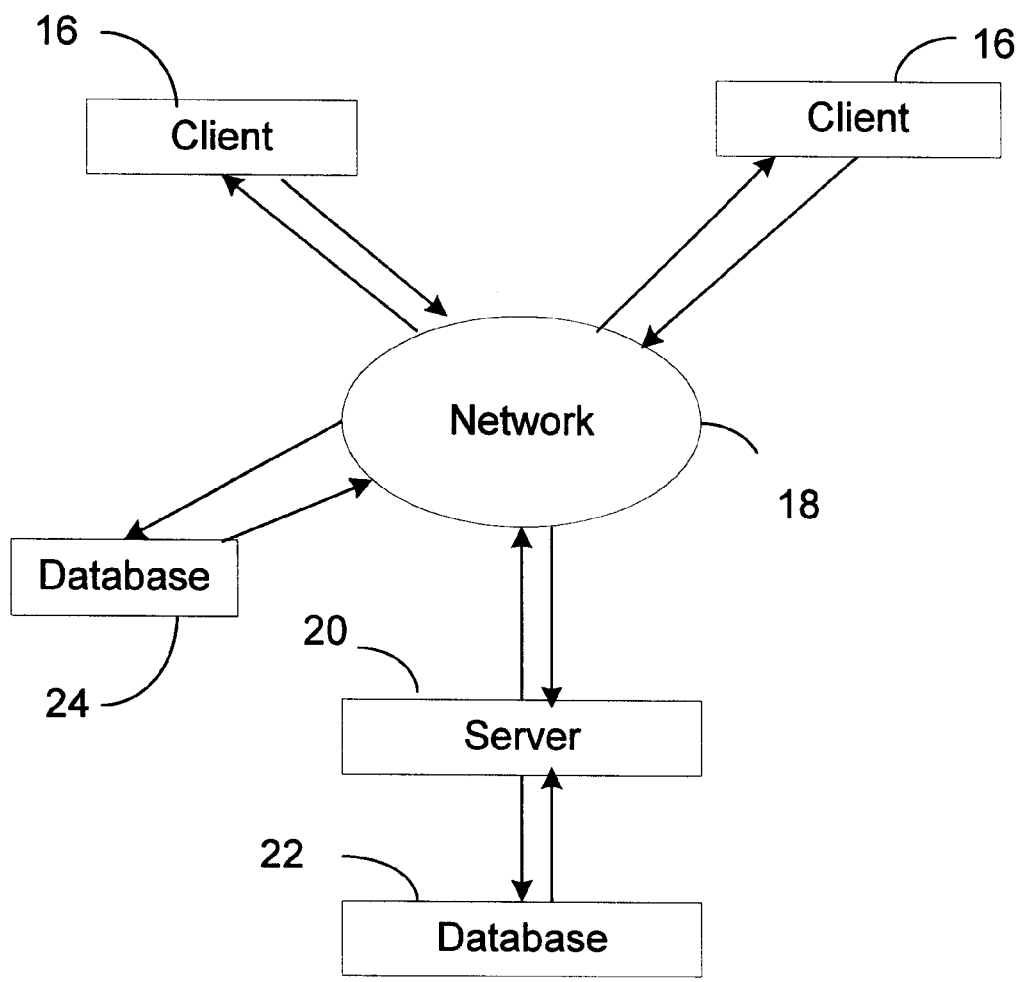
FIG. 2 is computer hardware diagram showing the interconnection of prior art client and server hardware used to implement a preferred embodiment of the present invention.
Figure 3:
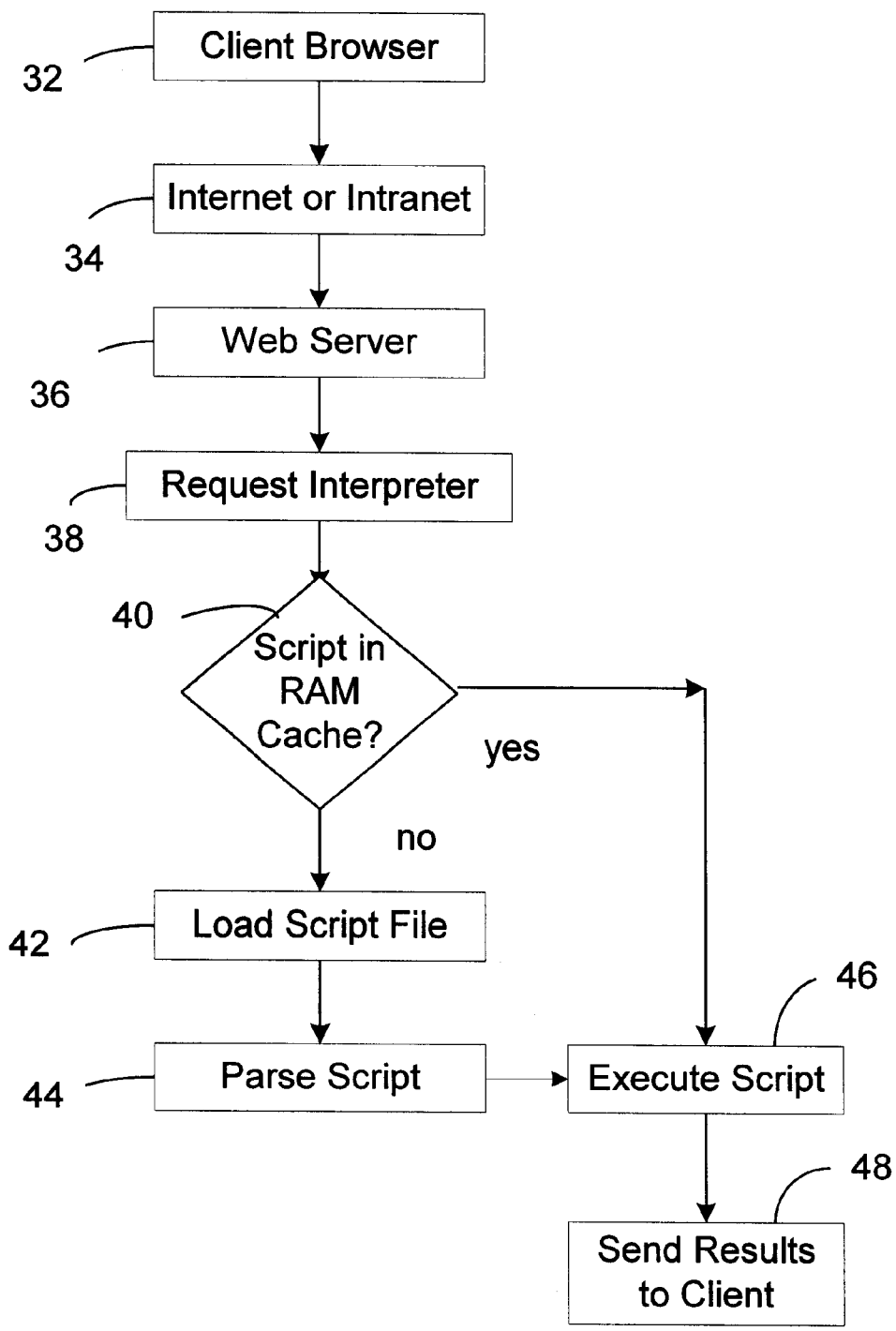
FIG. 3 is a flow chart showing a dynamic document access process of a preferred embodiment of the present invention wherein a caching process is used to speed performance when a client accesses a dynamic document.

A simple networking environment is illustrated in FIG. 2 where one or more client computers 16 is connected to a computer network 18. This computer network 18 may be a localized network or intranet or may utilize a wide-area network structure or the Internet to communicate with a server 20. Server 20 may communicate with a database engine 22 which can be physically located on the server hardware itself or elsewhere. In some embodiments, server 20 may communicate directly with database engine 22 or may employ the network or Internet communications capability to access the database engine. In a preferred embodiment of the present invention, as shown in FIG. 3, a client computer running web browser software 32 is connected to the Internet or an intranet 34. The client web browser initiates a request for a specific Web page represented by a URL address. The request is sent over the Internet or intranet 34 to the web server 36 where the URL is located. The web server 36 finds the document associated with the requested URL and, in a preferred embodiment, checks the file extension of the document which indicates whether inventive script commands of the present invention are contained therein. If the inventive script commands are not present in the document, the document is immediately sent to the client web browser in its current form.

If the inventive script commands are present in the document, the document is sent to the interpreter 38 of the present invention. At this point, the request interpreter 38 checks to see if the script has already been loaded and parsed making it ready for execution. This may have taken place during a prior request for the Web page. If so, the script will be held in a RAM cache or otherwise stored in an executable form 40 and will be immediately executed 46 when the page is requested. If the file has not been previously accessed, the script will have to be loaded 42 and parsed 44 before execution 46.

Figure 4:
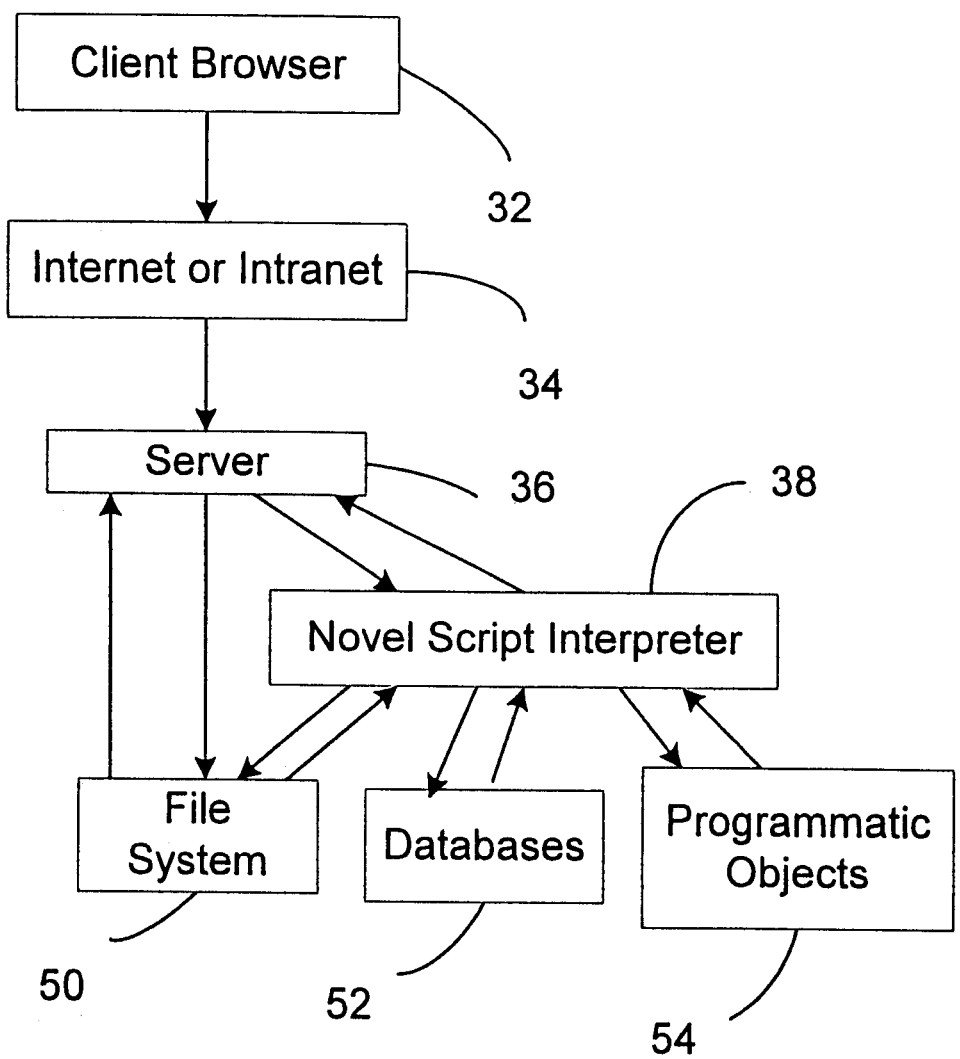
FIG. 4 is a data flow chart showing data requests and file transfer between components of a preferred embodiment of the present invention.
Figure 5:
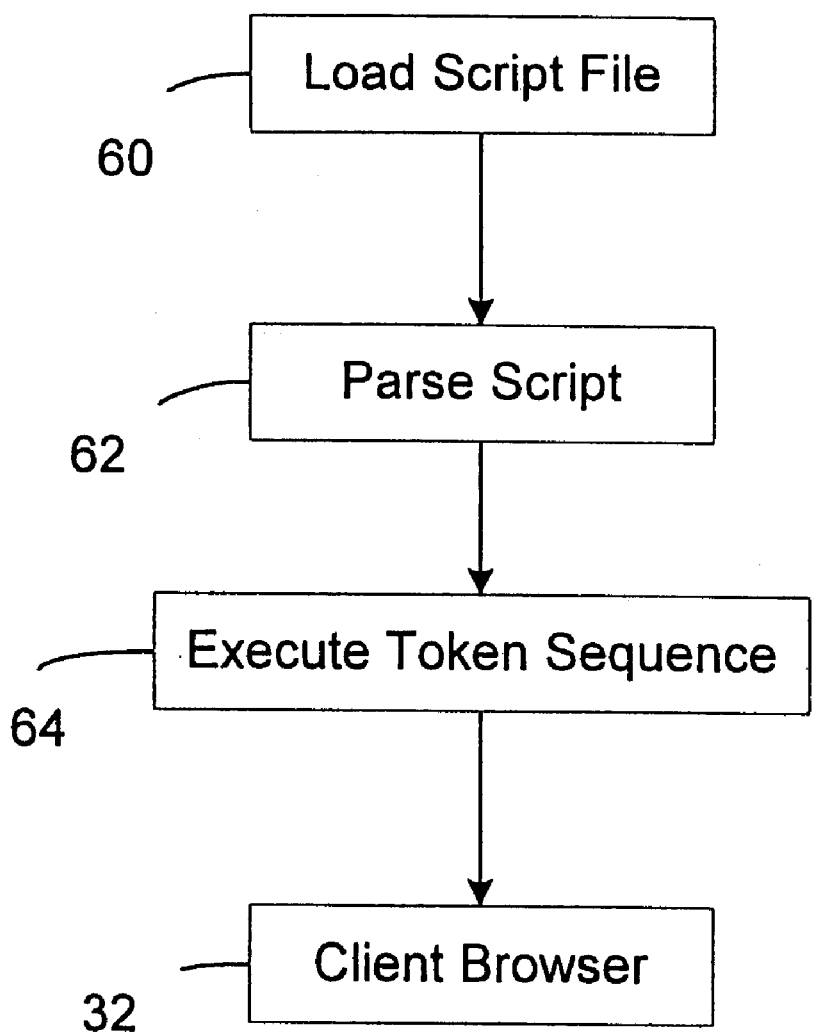
FIG. 5 is a flow chart depicting the process whereby the inventive script of the preferred embodiment of the present invention is loaded, parsed, interpreted and executed and sent to the client.
Figure 6:
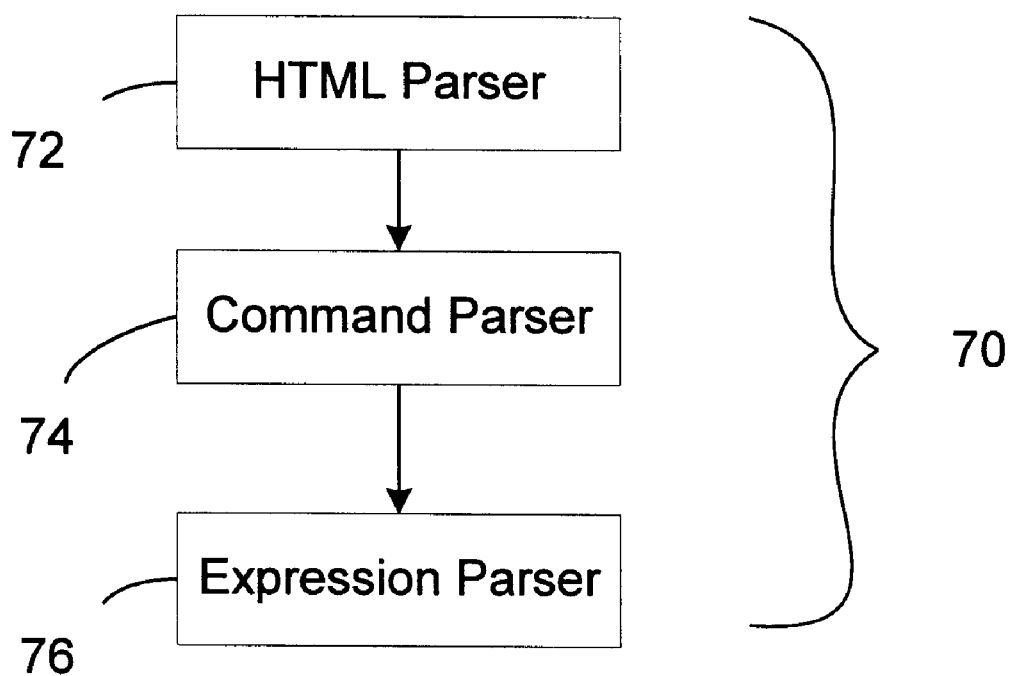
FIG. 6 is a flow chart showing details of the script parsing process.
Figure 7:
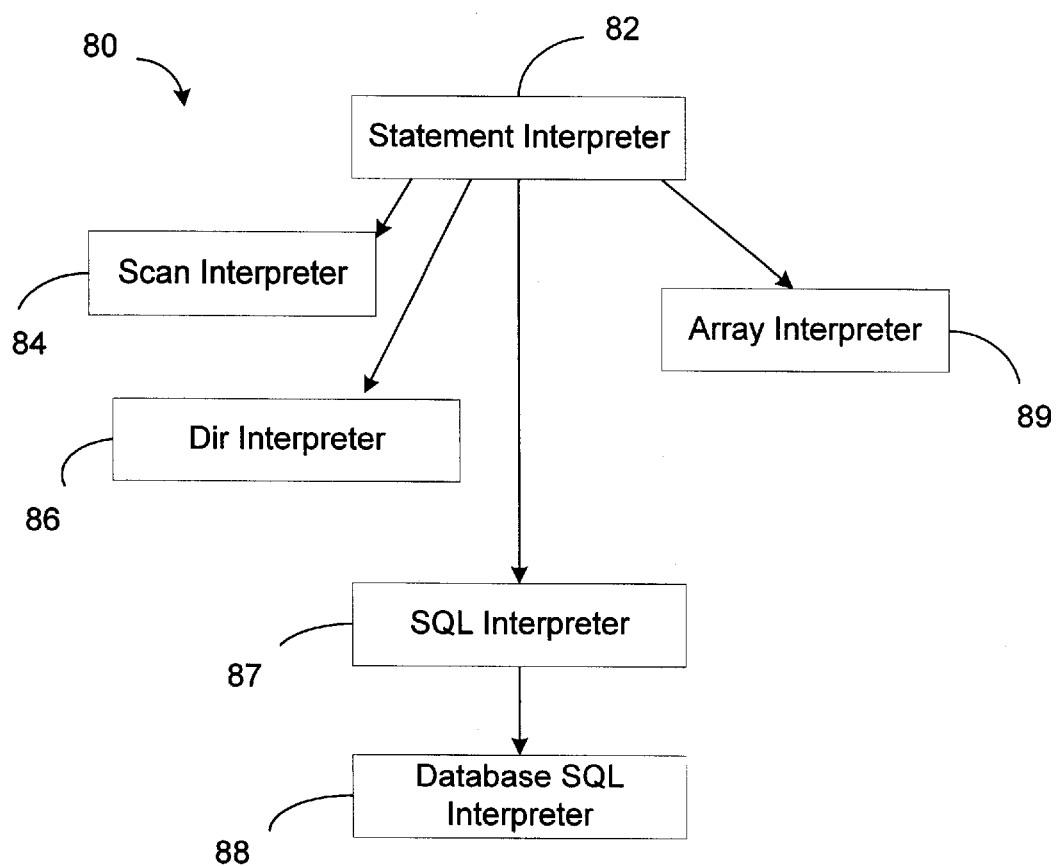
FIG. 7 is a flow chart showing details of statement handling or interpreting.

The data flow characteristics of the preferred embodiment of the present invention is shown in FIG. 4 where a client browser 32 is again shown making a request over the Internet or an intranet 34 for a specific document. The server 36 receives the request and, when the file extension indicates that inventive script commands are not present in the document, accesses the file system 50 to retrieve the requested document and deliver it to the requesting browser 32. When the inventive script commands of the present invention are present in the document, the request is passed to the novel script interpreter 38. The script interpreter 38 interprets the inventive script commands in the document and, depending on the nature of the script commands, may access files in the file system 50, access one or more databases 52 or execute one or more programmatic objects 54. A detailed list of the inventive script commands of the present invention and the actions they invoke is given below.

The script processing method of the preferred embodiment of the present invention begins by loading the script file 60. In the Web application of the preferred embodiment, this file will be an HTML document that contains, in addition to text and HTML code, novel script commands. However, in other embodiments of the present invention, the novel script commands may be used to enhance other types of files. By way of example and not by limitation, these files may be spreadsheet files, word processor files or graphics files or combinations of file formats such as graphics or other files embedded in HTML documents. A script file may be any file which contains the novel script commands of the present invention.

Once the script file is loaded, the interpreter of the preferred embodiment of the present invention parses the script 62 thereby creating sequentially ordered tokens for each element of the file. These elements comprise HTML tags, text, inventive script commands of the present invention, and expressions used by these inventive commands such as database or file locations. After the file elements have been converted to executable tokens they are assembled into an executable token sequence which will be executed immediately and cached so it may be re-executed each time the page is requested in the future. Execution of the token sequence 64 creates a new "pure-format" or "pure-HTML" document that is sent to the client browser that requested the document 32. Accordingly, a dynamic document is created as the page is updated or recreated each time the page is requested.

When a script file is initially loaded 70, the elements of the file are parsed by a series of parsers which recognize and process individual types of commands and their related expressions. The HTML parser 72 distinguishes between HTML tags and inventive script commands in the file and creates tokens for contiguous HTML blocks. The Command parser 74 recognizes the inventive script commands of the present invention and creates tokens for each of these commands. When an inventive script command contains one or more expressions, the expression portion of the inventive script command is sent to the expression parser 76 which creates an expression tree for the expression which is passed back to the command parser 74 and incorporated into the token for the inventive script command.

The statement interpreting process occurs at the time the token file is executed 80. This occurs each time a statement is encountered while executing a script. At this point, the statement interpreter 82 determines the type of statement and sends the statement to the interpreter appropriate for that statement.

When a scan statement is encountered by the statement interpreter, the statement is sent to the Scan interpreter 84 which interprets the statement by extracting designated words from strings as indicated in the statement.

When a directory statement is encountered by the statement interpreter, the statement is sent to the Dir interpreter 86 which will interpret the statement and enumerate the files within a directory.

The statement interpreter will, likewise, find array statements and send them to the Array interpreter 89 which will interpret those statements by iterating through the designated arrays.

SQL and database related commands are sent by the statement interpreter 82 to the SQL interpreter 87 which will directly interpret a database switching modifier. Other database commands or the remainder of a statement containing a database switching command will be forwarded by the SQL interpreter 87 to a Database SQL interpreter 88 which is external to the preferred embodiment of the present invention and typically resides in a database driver or engine program.

Figure 8:
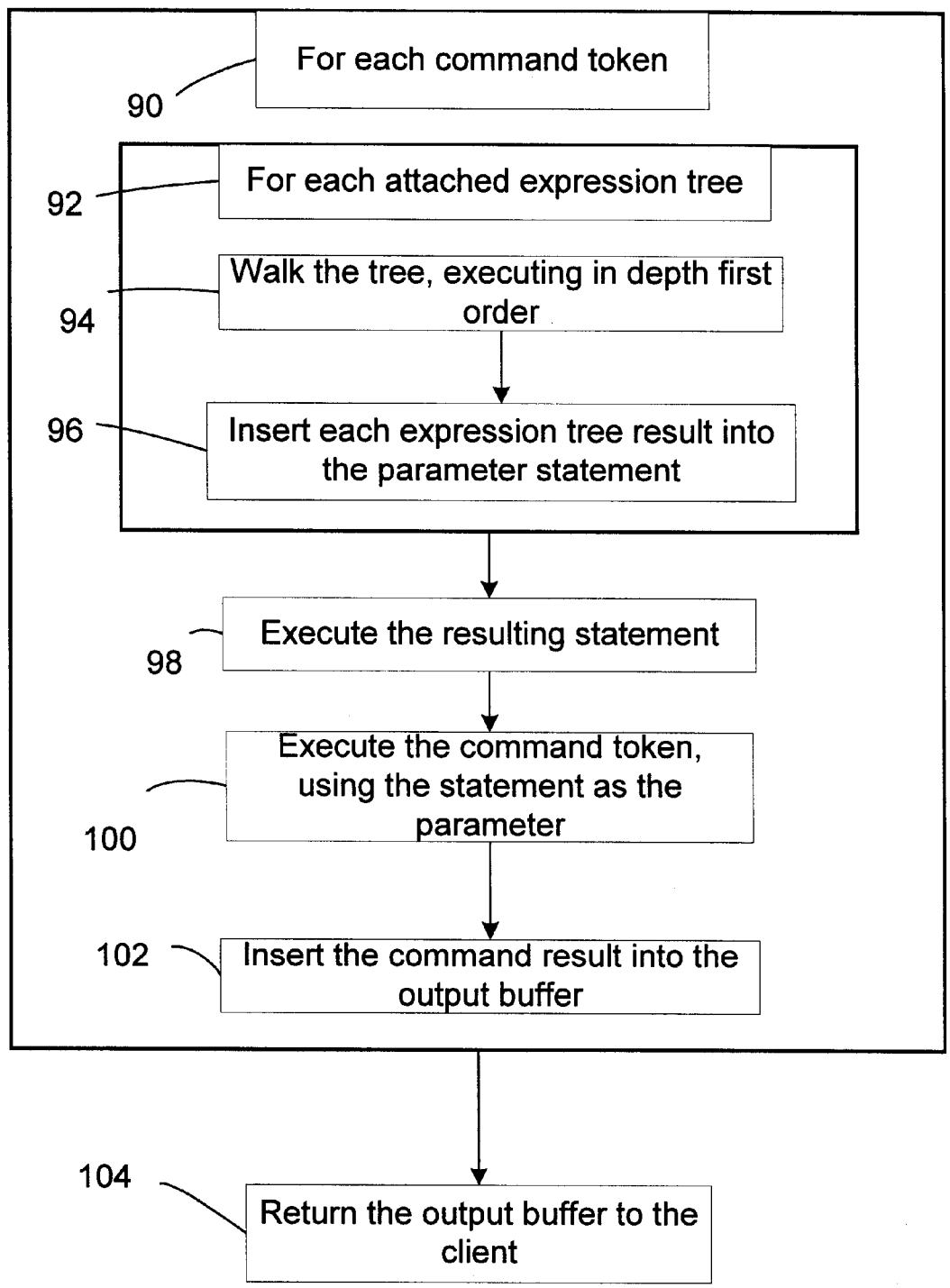
FIG. 8 is a flow chart showing the process of interpreting expressions and tokens.

During the script execution process, as detailed in FIG. 8, each command token is processed sequentially. If expression trees are attached to command tokens, they are also processed in the order encountered. Expression trees 92 follow an expression hierarchy or tree structure. When the result of an expression is dependent upon another, the script execution process of the preferred embodiment of the present invention executes the expressions in order 94 starting with the outermost expressions on the expression tree. The expression results are, then, inserted into the expressions of the next order until all expressions have been processed and the main parameter statement is ready to execute 96. This statement is subsequently executed 98 by the statement interpreter 82 to the appropriate interpreter which executes the command token 100 thereby returning a result which is sent to an output buffer 102 where it is combined with the results of other tokens to form the resulting dynamic Web page which is sent to the client 104.

In order to increase performance, the preferred embodiment of the present invention utilizes caching techniques. A RAM cache technique is used to speed response time when a dynamic document is requested by a client. A file cache may also be used to increase performance.

Figure 9:
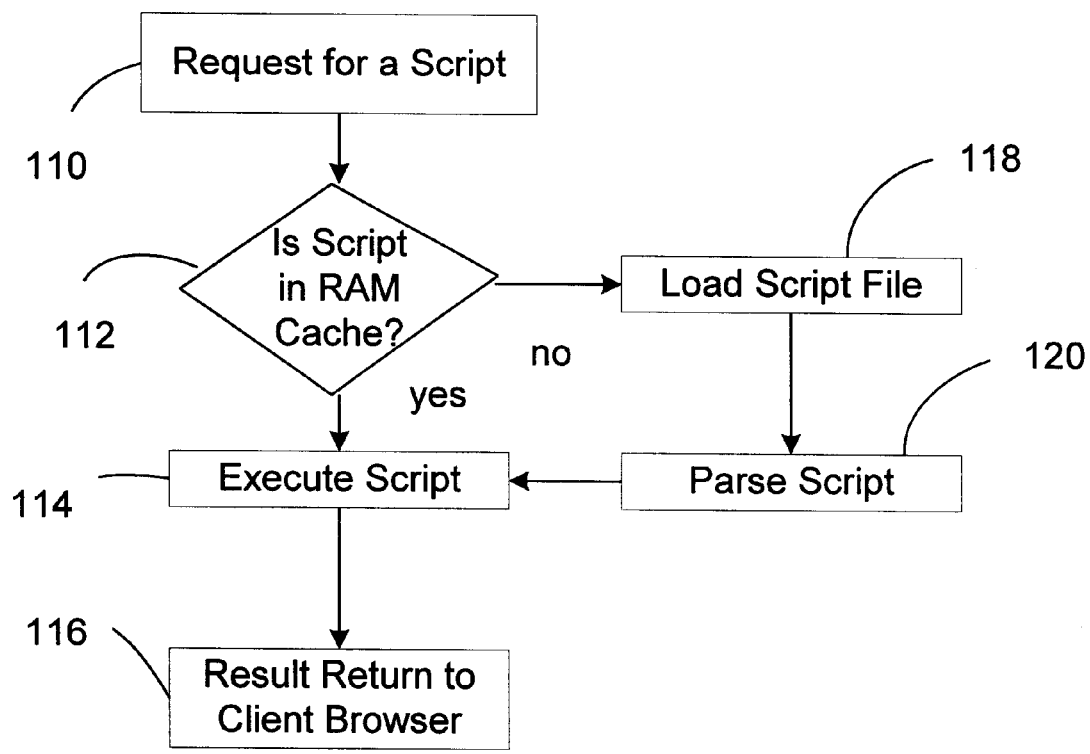
FIG. 9 is a flow chart showing how a caching process of the present invention is implemented.

When an inventive script document is requested 110, as shown in FIG. 9, the server checks to see if the script is stored in RAM cache 112, if so, the script is immediately executed 114 and the resulting HTML document is sent to the client browser 116. If the script is not stored in RAM Cache, the script file is loaded 118, and parsed 120 before execution 114 and, finally, sent to the client browser 116.

A programmer may use the Source command or Target command to control program execution for file caching and to relate script files. Using the inventive scripting language of the present invention, a script file may contain script commands which, when executed, create a new script file. The file from which the new file was created is referred to as a source file. The Source command initiates a comparison between the current file and an associated source file from which the current file was created. When a Source command is encountered during execution, the creation date of the current file is compared with the creation date of the associated source file. The file with the most recent date, the newer file, is selected for execution.

When a Target command is encountered during script execution, the output of the execution process is written to a target file which may be another script file which can be subsequently executed.

Figure 10:
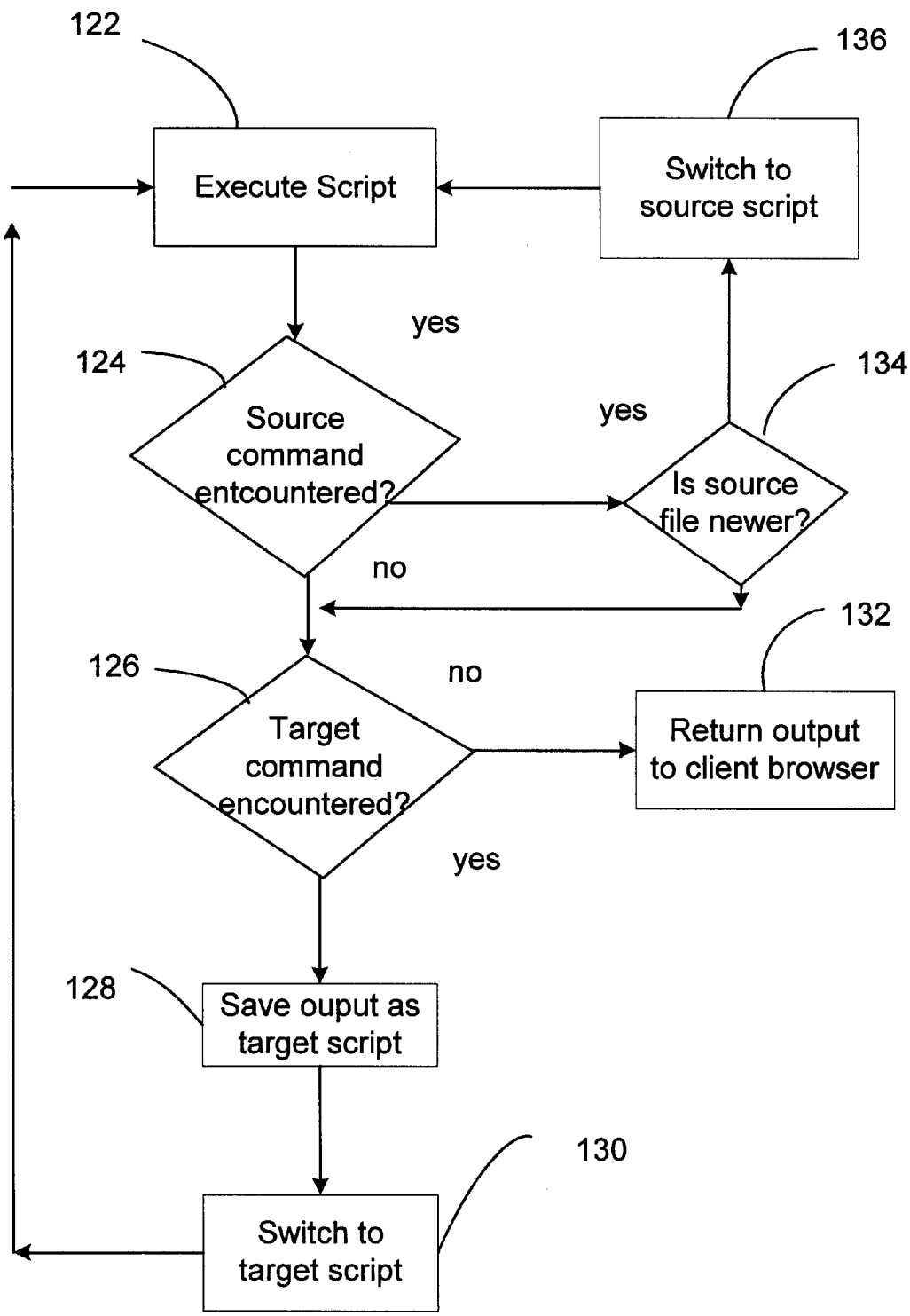
FIG. 10 is a flow chart showing the function of TARGET and SOURCE commands in script execution.

The operation of the Target and Source commands may be more fully understood by reference to FIG. 10. During the execution of a script file 122, if a source command is encountered 124, a comparison is made to determine whether the source or current file is newer 134. If the source file is newer, the execution process switches to the source file 136 and executes the source file 122. If the current file is newer, execution of the current file proceeds. The Source command can, therefore, be used to ensure that the most current version of a file is used.

If a target command is not encountered 126 during execution of a script file, the output of the script execution will be sent to a client browser 132 or other source which initiated the scripted document request. When a Target command is encountered the output of the script file execution process will be written to a target file rather than being sent to the client 128. The execution process will then switch to the target script file and execute the target file. The Target command allows intermediate files, which may be more easily edited, to be created and programmed. It also allows file execution to become an iterative process and allows for the dynamic document to be cached in a file.

Figure 11:
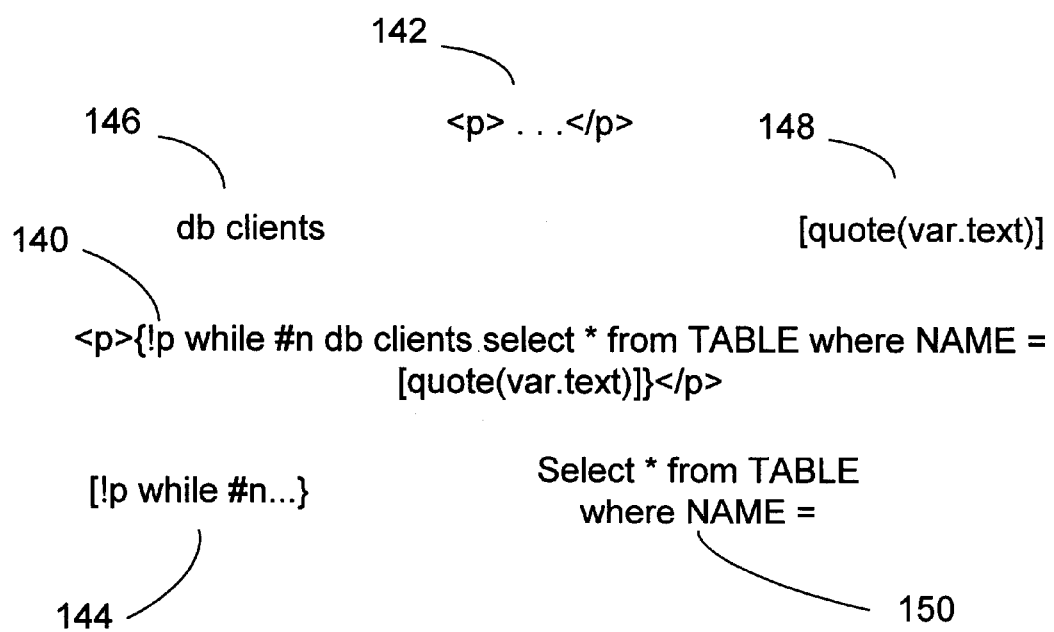
FIG. 11 illustrates the components of an inventive script command as used in a HTML document.

In FIG. 11, the syntax of the scripting language of the preferred embodiment of the present invention is illustrated. An example line of code is shown 140 with various tags and commands therein. Within the code are some HTML tags 142 which will be differentiated and processed by the HTML parser 72. Script command syntax 144 is parsed and processed by the command parser 74. Database switching syntax 146 within the code line is parsed and sent to the SQL interpreter 87 for processing. When found in the code, expression syntax 148 is parsed and sent to the expression parser 76 for processing. When database access and manipulation is performed, SQL syntax 150 will be present. This will be sent to the database SQL interpreter 88 for processing.

In order to more fully demonstrate the capabilities of the preferred embodiment of the present invention, the following list of program properties, commands and functions is presented along with an explanation of each. This listing is offered as an example of the inventive commands of the preferred embodiment of the present invention and is not to be construed as a limitation to the scope of the claims of this patent.

0.1 Standards

The format of this listing is as follows: syntax is in italics, and commands and functions are bolded within paragraph descriptions. Also example scripts use Courier Font.

0.2 Introduction

The server-side scripting language and programming tool of the present invention is called BrowZ Script. Its purpose is to greatly simplify programming for many types of web database applications. To use it, create normal HTML pages, then place special tags containing BrowZ Script commands in the pages. These tags are replaced dynamically with the result of the command execution when the script is requested by a browser and executed by the server. Several of the commands execute SQL statements against a database, and others retrieve data from the resulting rows and columns. BrowZ Script takes full advantage of the power of SQL and relies heavily on the resulting data.

BrowZ Script also supports the retrieving of data from HTML page forms as well as arguments passed after a question mark '?' at the end of an Internet address or URL.

BrowZ Script has extra features for ease of programming, such as allowing you to use your favorite web page designer and editor for adding and editing of your script tags. Some knowledge of HTML is needed to take advantage of this feature.

1.0 Installation 1.1 Server

BrowZ Script is implemented as a Java servlet. So, your web server must support servlets, either natively or by use of a server plug-in or CGI. If your server does not have built-in servlet support you must install one of several server plug-ins. Most of these servlet add-ons are free or inexpensive. Most of these plug-ins, however, will also require that you have a version of Java installed on your server. This can be freely downloaded from Sun's Java web site, www.javasoft.com. You'll need to download and install the JRE (Java Runtime Environment) or the JDK (Java Development Kit).

BrowZ Script is implemented in Java therefore you can run it on any operating system platform for which the Java runtime is available, which includes just about all of the modern ones.

1.2 Files

BrowZ Script is entirely contained within the BZScript.jar file. You'll need to configure your server (or the server plug-in) by adding this file to its Java CLASSPATH. Some servers may work if you simply copy this file into the Servlets folder. Check with your server or plug-in for proper installation of servlets.

1.3 Database

BrowZ Script requires a JDBC (Java DataBase Connectivity) or ODBC (Open DataBase Connectivity) driver to be able to communicate with your database. It is usually fastest if you have a JDBC driver for your particular database, but an ODBC driver will work fine if you do not. If you are using JDBC you'll need to know the JDBC URL to your database. Look in your driver's user manual for the proper URL to use for each of your databases. If you choose to use ODBC, you must set up a DSN (Data Source Name) for each database you wish to communicate with. The JDBC URL you will use will be as follows: "odbc:your_dsn".

2.0 Properties Files

These files give information to BrowZ Script concerning all of the files in a directory and the databases with which they plan to connect. For every folder in which BrowZ script is going to process files there must be a properties file called "BZScript.properties". This is a plain text file usually containing four definitions, similar to the following:

driver=sun.jdbc.odbc.JdbcOdbcDriver database=odbc:MyDSN username=MyUser password=MyPassword The driver parameter defines which Java driver to load. In this case, we are loading the built-in ODBC driver. If you use another driver you would place its class name here. Driver defaults to sun.jdbc.odbc.JdbcOdbcDriver.

The database parameter defines the JDBC URL to the database. This is dependent on the driver you use and the database you are connecting to. Since we used the ODBC driver we specified an ODBC URL containing the DSN.

The username and password parameters are used when your database requires a user name and password to access the database. You may include a space character, if needed, within the value, but do not surround it by quotation marks, as you might think. Also, do not put spaces or tabs on either side of the equal sign '='. The name, the equals sign, and the value must be run together with no white space.

BrowZ script is not limited to only one database as described above. In order to support connections with more than one database the contents of the BZScript.properties file has to be changed a little. Let's start with an example and then explain the differences:

databases=customers, finance customers.driver=sun.jdbc.odbc.JdbcOdbcDriver customers.database=odbc:CLIENTS finance.driver=sun.jdbc.odbc.JdbcodbcDriver finance.database=odbc:FINANCE finance.username=MyUser finance.password=MyPassword First notice the databases parameter. This is where you list all of the databases with which you wish to connect. All other parameters have the database name and a period before them, specifying the database to which they belong. Unless otherwise specified, BrowZ Scripts assume a connection with only one database. This default database will always be the first one listed in the databases parameter. To communicate with another database the programmer will have to specify the connection change within each script needing it. This can be done with the db command or with the db modifier in any command using SQL.

There are other variables allowed in this file that will enable verbose debugging features of BrowZ Script. To enable these features you should set the object and either the debug or trace variable to 1. The debug variable is less verbose, but more useful. The trace variable is only useful if you have the BrowZ Script source code. It will show you every function which was called. The recent debug/trace log, if any, will be attached to the bottom of the each script output. This log is also appended to a file called BZScript.log on the server. This log file is cleared each time BrowZ Script is restarted. The example below turns on all debug and trace features in BrowZ Script. It is strongly recommend, however, that you never use all of these together. open.debug and var.debug are usually the most useful.

open.debug=1 # Logs all statement executions open.trace=1 # Logs all internal statement related function calls var.debug=1 # Logs all input and temporary variable accesses var.trace=1 # Logs all internal var related functions calls prop.debug=1 # Logs all property variable accesses prop.trace=1 # Logs all internal property related function calls session.debug=1 # Logs all session variable accesses session.trace=1 # Logs all internal session related function calls One last thing, the properties file is not limited to just the variables detailed above. You may place many other parameters in this file, and retrieve them from any script in the same directory, using the prop object. See section 3.5.3 for more information on prop object.

3.0 Language

This section details the language of BrowZ Script. To begin with, you need to know that BrowZ Script files are usually just normal HTML files, containing one or more BrowZ Script commands. These commands may be placed anywhere within the HTML document, but it is usually wise to place them in such a way that you do not break any of the HTML syntax rules. This recommendation becomes a requirement if you use an HTML page editor, such as Microsoft FrontPage, Adobe PageMill, or Netscape Composer to add or edit your BrowZ Script files.

BrowZ Script is designed to be case insensitive, but this has not been thoroughly tested yet. Only fully lower case commands, functions, objects, and variables have been tested.

3.1 Syntax

'{' ['!' <html tag>] <command> ['#' <name>] [<parameters>] '}'

3.1.1 Brace Delimiters

Commands are delimited by curly brace characters, '{' and '}', at the beginning and end of each. When you're debugging, always make sure that these braces appear at the beginning and end of each command.

Note: In BrowZ Script 1.0 the tilde '' character was used to delimit BrowZ Script commands. These were harder to read and match up when lots of commands were placed close together, so the change was made to curly braces. However, the tilde characters are still supported in 1.2, and you may see some BrowZ Script files using them. But, these characters will not be supported in future versions of BrowZ Script so it is strongly recommended that you use the preferred curly braces, and begin fixing all 1.0 BrowZ Script files.

3.1.2 HTML Tag Stripping

Following the open brace is an optional exclamation point, '!', and an html tag name. BrowZ Script always strips the entire command from the output. However, in order to maintain the normal rules of HTML sometimes you have to place commands within a paragraph or table cell. There are HTML tags that get added to the document by the editor which surround the BrowZ Script command. However, you usually do not want these extraneous tags to appear in the output. You can specify that you wish them striped by adding the exclamation point, '!', and the name of tag you wish to be stripped. Sometimes there is more than one tag that surrounds your command. An example of this is when you place a command in a cell of a table. If you want the entire row removed, rather than just the cell you are in, you would use '!tr' as the tag to strip. All tags and text including the one you specify the BrowZ Script command and those following the command until the trailing tag will be stripped.

In order for this to work properly you must specify the tag using the same case as the HTML tag. HTML is not case sensitive but BrowZ Script is in this instance. Also, there must be a matching trailing tag. Some page editors do not add the trailing tag in some instances but this is required for BrowZ Script stripping, and it follows that the case of the trailing tag must match also. The best and sometimes only way to use this feature properly is to switch to HTML mode temporarily to see what the first tag you wish to strip is and to note its case.

Here is an example to illustrate how this stripping works:

<p>{!p while select * from MyTable}</p>

In this example the matching paragraph tags as well as the BrowZ Script command will be stripped from the output. Since while commands output no text by themselves the output will contain no evidence that the command was even there. Here is another example:

<table><tr><td>To Do List</td></tr>
<tr><td><p>{!tr while select * from PROJECTS where PROJ='My Project'}</p></td></tr>
<tr><td>{[row.ACTION]}</td></tr>
<tr><td>{!tr end}</td></tr></table>

In this more complicated example the programmer wished to completely remove the rows containing the if and end commands, not just the commands themselves. Also, by using the while command BrowZ Script will repeat everything between the while and end commands for each record found in the database, which in effect adds a row for each. The output of this script would look something like this:

<table><tr><td>To Do List</td></tr>
<tr><td>Write the code</td></tr>
<tr><td>Test the code</td></tr>
<tr><td>Write the manual</td></tr>
<tr><td>Prepare the packaging</td></tr>
<tr><td>Ship it!</td></tr>
</table>

If the programmer had not put in both '!tr' options the output would have looked like the following, which is definitely not correct HTML:

<table><tr><td>To Do List</td></tr>
<tr><td><p></p></td></tr>
<tr><td>Write the code</td></tr>
<tr><td></p></td></tr>
<tr><td>Test the code</td></tr>
<tr><td></p></td></tr>
<tr><td>Write the manual</td></tr>
<tr><td></p></td></tr>
<tr><td>Prepare the packaging</td></tr>
<tr><td></p></td></tr>
<tr><td>Ship it!</td></tr>
<tr><td></td></tr>
</table>

Of course you can avoid this entire problem by simply using a text editor rather than an HTML editor, and disregard the rules of HTML. In this case you would have written the following simpler script to produce the same output:

<table><tr><td>To Do List</td></tr>
{while select * from PROJECTS where PROJ='My Project'}
<tr><td>{[row.ACTION]}</td></tr>
{end}</table>

Don't try to load this script into an editor which knows HTML, because it will definitely complain, or worse, attempt to correct the problem. The command itself is not optional. Also commands are not case sensitive. Each command is itemized in section 3.2.

3.1.3 Name

You may optionally name any statement using a single word or number. This is used when you need to refer to the results of a previous SQL command, after executing another, but is not needed to refer to the results of the current SQL command. See the row object for more information.

Here's an example:

<p>List of items found:</p>
<p>{!p while #tb select * from TABLE}</p>
<p>{!p if select * from ANOTHER where A_STATE='[row.T_STATE]'}</p>
<p>{[tb.T_NAME]}</p>
<p>{!p end}</p>
<p>{!p end}</p>

In this example we're printing the T_NAME field from TABLE, but only if the value of that record's T_STATE field is found somewhere in the A_STATE field of the ANOTHER table. If we didn't use the #tb name, we would only have been able to print fields from the ANOTHER table, using the row object. See section 3.5.4 for an explanation of the row object. We could have accomplished the same thing by storing the T_NAME field into a temporary variable, using the var object, so we could access it from within the if command. See section 3.5.6 for an explanation of the var object.

Note also the use of the row object within the parameter of the if. Access to fields of the row object does not change until the closing brace of the next command containing a statement. This means that row continues to refer to the current record of the while command until the closing brace of the if command, at which point it changes to the row returned from the result of the if. Row again switches back to the row from the while command after the first end, which ends the if and closes the statement's results. See section 3.2.5 for more details on the end command.

3.1.4 Parameters

The parameters to a command vary depending on the command used. Usually, the parameters are a statement, such as SQL. Note, one or more expressions may be used anywhere within the parameters section. See section 3.4 for information on how to add and use expressions of objects and functions.

3.1.5 Special Characters and Sequences

Since HTML empowers certain characters with special meanings BrowZ Script has to be flexible in its interpretation and use of these. If your HTML editor inserts a &lt; instead of a less-than character '<' into your SQL statement, BrowZ Script will properly convert it to a less-than character '<' before attempting to execute it. The following are all of the automatic translations made by BrowZ Script.

%XX

A percent sign '%' followed by two hex digits will be converted into the corresponding ASCII character.

<, >,  , &

These will be converted into less than '<', greater than '>', space ' ', and ampersand '&', respectively.

\{, \}, \], \\

When you need BrowZ Script to ignore any special meaning of a character in your scripts simply precede the character by a backslash '\'.

<br>, Carriage Return and Line Feed

Carriage returns and/or line feeds within commands will be converted to a space. This is because HTML editors insert spaces in arbitrary positions within long lines. However, if you really do want carriage returns within a command, such as within quoted text, use an HTML line break, <br>. All <br> tags founds within commands will get converted to a carriage return and line feed.

3.2 Commands

Here is a list of commands in BrowZ Script, grouped by relationships.

| Flow Control | Inter-file | Assignment | File |
|---|---|---|---|
| Do-end | Insert | Set | Copy |
| If-else-end | Redirect | Unset | |
| while-else-end | Target | Default | |
| Db | Source | | |

3.2.1 Do Command

Syntax: do <statenment>, [end]

The do command executes a statement unconditionally. Any statement may be executed, including SQL, scan, dir, and array statements. See section 3.3 for more information on statements. The do command produces no direct output A matching end command, which should follow the do command somewhere in the script, closes the statement. It is not necessarily required to have a matching end command because all open statements will be automatically closed when a script completes, but it is better to explicitly end (close) each statement when you are done with it. The end command is required if you need to access results from an outer statement, if or while command when you nest more than one. Here is an example of the use of the do command.

<p>{!p do insert into MyTable (T_NAME, T_PHONE, T_DATE) values ([quote(var.name)], [quote(var.phone)], [date(sql, today())])} {end}</p>

<p>A new record was added to the database.</p>

Note: mn BrowZ Script 1.1 and previous this command was named sql. In 1.2 sql is still allowed but is deprecated in favor of do, because statements are no longer limited to just SQL any more. Please use do instead of sql and fix your old scripts, because a future version of BrowZ Script will not support the sql command.

3.2.2 If Command

Syntax: if [<statement>| '['expression']'|], [else], end

The if command executes a statement unconditionally. It also controls the output and execution of HTML and commands which follow it. If the statement or expression results in a true condition all html and commands after the if until the matching else and/or end command are executed and output. A matching else command is not required, but if used, the HTML and commands between the else and the end are executed and output if the condition is false.

The condition is based on the results of the statement or the value of the expression. The condition will be true if a statement results in 1 or more rows, and false if it results in no rows. The condition will be true if an SQL insert, delete, or update statement results in 1 or more rows being modified and false if no rows were modified.

If you specify an expression as the parameter to if then the condition is based on the results of the expression. If the expression results in a number, then 0 or a negative number mean false, and 1 or greater mean true. If the expression results in a string then a null or zero length string mean false, and a string containing 1 or more characters mean true, including the word "false" so be careful. If the expression results in any other object, then a null means false, and any object means true. Here is an example of the use of an if command.

<p>{!p if update MyTable set T_NAME=[quote(var.name)] where T_ID=[var.id]}</p>

<p>Record # {[var.id]} has been saved.</p>

<p>{!p else}</p>

<p>Error: Record #{[var.id]} does not exist.</p>

<p>{!p end}</p>

If you do not include a parameter of any kind then the condition is based on the previous statement executed, such as a previous do, if, or while command, though the most common of these is the do command. This may be useful when you wish to execute a command previous to where you want to conditionally execute other commands or HTML.

3.2.3 While Command

Syntax: while [<statement>| '['expression']'|], [else], end

The while command is similar to the if command, except that it repeats in a loop until the condition becomes false. It also increments the row in the results of the statement when a statement returns more than one row. Everything after the while command to the end or else will be output or executed for each row returned in the result. If there is an else and the statement results in an empty table or no rows affected then everything after the else command to the end command is output once, the same as an if command. If an expression is used as the only parameter then the while will continue as long expression evaluates to true. See the if command for details on how objects are evaluated to a true or false. Here is an example of the use of the while command.

<p>{!p while select * from MyTable where T_NAME like '%[var.name]%'}</p>

<p>Name: {[row.T_NAME]}, Phone: {[row.T_PHONE]}</p>

<p>{!p else}</p>

<p>No names were found containing '{[var.name]}'.</p>

<p>{!p end}</p>

If no statement or expression is included then the while will be executed based on the result of the previous SQL executed in the file. This is useful, for instance, when you want to execute part of your script a single time, if any rows are returned, and part of your script repeatedly, for each row returned. Below is an example of this:

<p>{!p if select * from MyTable where T_NAME like '%[var.name]'} Here is the select for both the if and while commands.</p>

<table><tr><td>Name</td><td>Phone</td></tr>

<tr><td width=2>{!tr while} Notice the lack of a statement here.</td></tr>

<tr><td>{[row.T_NAME]}</td><td>{[row.T_PHONE]}</td></tr>

<tr><td width=2>{!tr end} This ends the repeated part.</td></tr>

<tr><td width=2>{[row]} names were found.</td></table>

\<p\>{!p else} Matches the if.\</p\>

\<p\>No names were found containing '{[var.name]}'.\</p\>

\<p\>{!p end} This ends the if.\</p\>

3.2.4 Else Command

Syntax: if else end

Or: while else end

The else command is used only in conjunction with the if or while commands. It is always optional and specifies where to start outputting if the condition of the if or while is initially false. Any parameters added to this command are ignored so the parameter may be used as a comment.

3.2.5 End Command

Syntax: do end

Or: if else end

Or: while else end

The end command is used only in conjunction with the do, if, or while commands. For the all of these commands end specifies the end of the conditional or repeated output. It closes the statement, if any were opened in the matching do, if, or while command. In the case of the while command, it closes the statement once the last row has been retrieved and the last loop has completed. End is recommended, but not necessarily required, for use with the do command, because all statements are closed when the script completes. However, if you nest more than one do, if or while you will be required to have an end statement before you can access results from the outer command. Any parameters added to this command are ignored so the parameter may be used as a comment.

3.2.6 Db Command

Syntax: db \<database\>

The db command switches the current database to the one you specify by name. This name must match the name you used in the properties file. All following SQL statements will be executed with the new database. Individual SQL statements may override this by specifying a database explicitly. See section 3.3.4 for more information on specifying a database from within an SQL statement.

Note: if you used the single database format for the properties file then the db command will not work and should not be used.

3.2.7 Insert Command

Syntax: insert \<file path\>

The insert command loads and runs another script. All objects, variables and their values are available to the inserted script. The remainder of the current script is also run after the inserted file executes, except in the case of redirect. See section 3.2.8 for more information on redirect. Any variables that were modified in the inserted script will keep their modified values after the insert completes and the current script continues. Insert is somewhat similar to a function or subroutine call in other languages. Inserted scripts may also insert other scripts, to as many levels as you desire. This command is useful when you need to execute and/or output the same or similar things from more than one script.

3.2.8 Redirect Command

Syntax: redirect \<file path\>

The redirect command loads and runs a script from another file and aborts the current script. All objects, variables and their values are available to the redirected script. Any output from the current script already created is discarded and not sent to the client. If the current script had been executed via an insert from yet another script, that insert is aborted also. In other words, the inserting script will not continue if a redirect occurs in the inserted script. In fact, redirect aborts all multiple levels of insert. There is no problem, however, for a redirected script to redirect or insert other scripts, as you so desire.

3.2.9 Target Command

Syntax: target [\<file path\>|'.'\<file extension\>]

The target command tells the execution engine to create a file and write the output of the current script to it, once the script completes. The output is not sent to client, but once the new script file is written this new script is then executed itself, and any output it generates will be sent to the client.

It is possible, and sometimes very useful, for the generated file to also, contain BrowZ Script commands. These will execute the same as if the file had been requested directly by the client. One very nice use for the target command is in the caching of dynamic pages, which change much less often than they are requested. In the case of caches, it is also useful to generate a source command to be placed in your target script referring back to the source script. This ensures that the target stays synchronized with the source. See section 3.2.10 for more information on the source command.

The parameter of this command is either a file path or a dot extension. The file path may be absolute or relative to the currently executing scripts folder. If you use a dot extension parameter then the new script will have the same name as the current one, but with the extension changed to what you specify.

The target command may be placed anywhere within the currently executing script. If it is placed within a conditional part of your script, such as between if, else, or end then it will only take effect if the condition allows the target command to actually execute. If it is skipped, for whatever reason, the current output will be sent to the requesting client and no file will be written, just as if the target command was not there.

I have not tested this yet, but it should be possible to create a one-shot script, a script that overwrites itself. When the script executes it changes itself, permanently. A good application of a one-shot script is left as an exercise to the reader.

3.2.10 Source Command

Syntax: source [\<file path\>|'.'\<file extension\>]

The source command tells the execution engine that the current script was created by another script. BrowZ Script will check the dates of the two files. If the current script is older than the source script then the current script is aborted and the source script is executed instead. Its is mainly useful when the script contains a target command. It allows the target script to refer to its source to maintain synchronization between the two files. See section 3.2.9 for more information on the target command.

The parameter of this command is either a file path or a dot extension. The file path may be absolute or relative to the currently executing scripts folder. If you use a dot extension parameter then the source script will have the same name as the current one, but with the extension as you specified.

3.2.11 Set Command

The set command will set the value of a variable. Once set, a variable holds and returns its value for the rest of the script, or until the script sets it again. Input and temporary variables are accessed through the var object. Currently, you may only set variables of the session or var objects. If you do not specify which object the member belongs to, the var object is assumed.

set \<[object.]variable\> [=] '[' \<expression\> ']'

This variation sets a variable with the value returned by the expression. The brackets are required and signal BrowZ Script to not execute a statement.

set <[object.]variable> [=] <statement>

This variation sets a variable based on the result of an SQL statement. The variable will be set with the value in the first column of the first row returned. All others columns and rows will be ignored. If an empty result set is return from the statement then the variable will be set to null. The statement is automatically closed so an end command is not needed, or allowed. This variation of set is really just a short cut and could be rewritten as follows:

{unset variable} {if <statement>} {set·variable=[row.1]} {end}

3.2.12 Default Command

Syntax: default <variable> '['<expression>']'

Or: set <variable> <select statement>

The default command is almost the same as the set command. It differs only in that it does not change the value of the variable if the variable already has a value assigned. It will only set the value of the variable if the variable is null or is not set.

3.2.13 Copy Command

Syntax: copy <sourcefile path> <target file path>

The copy command simply copies one file to another. The file names for the source and target must be specified. The path information may be relative to the current script's folder or absolute. BrowZ Script makes a copy of the file and also sets the modified date to be identical with the source.

3.2.14 Expression Command

Syntax: '[' <expression> ']'

The expression command simply outputs the results of the expression. It has no command name, just the expression itself, in square brackets, '[' and ']'. See section 3.4 for more information on expressions.

3.3 Statements

Statements are the workhorses of BrowZ Script; you will use these to do most of your work. Statements are the parameters to the following BrowZ Script commands: do, if, while, set and default. Statements include all of SQL, plus several BrowZ Script only additions. Statements may be modified in a way unique to BrowZ Script. BrowZ Script expressions may be used anywhere within the statement to make changes, customize, and parameterize it. Plus, there is a db modifier for SQL statements, used to switch connections between more than one database engine.

Here are the different types of statements:

| Statements | Description |
| --- | --- |
| Array | Iterates through an array, a variable which holds more one or more values |
| Dir | Iterates though a directory of files |
| Scan | Parses a string, interates through the words |
| (SQL) select | Iterates through a result set returned from a database |
| (SQL) insert, delete, update, etc. | Makes changes to a database, or does other database related SQL |

3.3.1 Array Statement

Syntax: array <variable>

The array statement is used to query and iterate through the values of a variable. All variables in BrowZ Script may contain 0 or more values. If the variable has no value, then the statement returns an empty result set. If the variable contains one or more values then each value will be accessed sequentially through the row object. This statement is usually used only in a while command. However, in an if command, the condition will be true when the variable has one or more values, and false otherwise.

Here are the fields available through the row object when using this statement with do, if, or while:

| Index | Fields | Description |
| --- | --- | --- |
| 1 | Item | The value |

3.3.2 Dir Statement

Syntax: dir <folder-path>

The dir statement is used to enumerate the files within a folder of the file-system. The path should be specified relative to the directory containing the executing script. Or it may be an absolute path, starting with the root directory. The path syntax can be based on the POSIX standard (Unix), using forward slashes, or it can be platform specific, such as with backslashes on Windows.

Information about each file will be returned as the result-set of the statement. This statement is usually used only in a while command. However, in an if command, the condition will be true when the folder has one or more files, and false otherwise.

Here are the fields available through the row object when using this statement with do, if, or while:

| Index | Fields | Description |
| --- | --- | --- |
| 1 | File | A string containing the full file name |
| 2 | Name | A string containing the file name, without the extension |
| 3 | Ext | A string containing the file extension, without the period |
| 4 | Size | An integer containing the file size in bytes |
| 5 | Date | A date containing the last modified date of the file |

3.3.3 Scan Statement

Syntax: scan [<delimiters>] <string>

The scan statement is used to parse a simple, delimited string. A sequential list of words will be returned as the result-set. If no delimiters are specified then all white space is used as the delimiter. Delimiters are specified as one or more non-alpha-numeric characters, followed by a space and the string to parse. The only special case delimiter is the underscore '_'. If you put an underscore as the first delimiter then whitespace will be added as part of the delimiters. An underscore may be a delimiter if you put one or more other delimiters first.

This statement is usually used only with a while command. However, in an if command, the condition will be true when the string has one or more words, and false otherwise.

Here are the fields available through the row object when using this statement with do, if, or while:

| Index | Fields | Description |
| --- | --- | --- |
| 1 | Word | A string containing the word |
| 2 | Delim | A string containing the delimiter(s) encountered following the word |

3.3.4 Select Statement (and all Result-set SQL)

Syntax: [db <database>] select <select clauses>

This includes all variations of the SQL select statement and any other SQL that returns a result-set. BrowZ Script sends the entire statement (after expression evaluation) to the current database. The current database is the latest database specified with a db command, or the first (or only) database specified in your BZScript.properties file. This statement is usually used with a while command. However, in an if command, the condition will be true when the result-set contains one or more rows, and false otherwise. If this is used with a set or default command, the variable will be assigned the first value returned, the first column and first row. All other columns and rows will be ignored.

3.3.5 All other SQL Statements

Syntax: [db <database>] <sql statements>

This includes all other SQL statements, including insert, delete, update, those that do not return a result set. The SQL is sent, same as above, to the current database. These types of statements are usually used with do, if, set, and default commands. Many, but not all, SQL commands will return a value, usually the number of rows modified. This number will be used in the condition of the if command, 0 meaning false, and all other values meaning true. When used with set or default, the value returned will be stored in the variable. It does not usually make sense to use this type of statement with a while command.

3.4 Expressions

Syntax: '[' [object\[object.]function(<expression>[, <expression> . . .]) ']'

Expressions are designed to return a value. They may be placed anywhere within the parameters of a command, such as within a statement. Or, the expression may be the entire command, (see section 3.2.14). Expressions are delimited by square brackets, '[' and ']'. They can be complex or simple. BrowZ Script 1.2 does not support in-line operator evaluation, such as '+', or '−', though this is planned for a future release, You may use any combination objects, object members, object functions and global functions. But, without in-line operators, you can only pass results from one expression as a parameter to a function, and nesting these function calls as deep as makes sense.

3.5 Global Objects

There are several objects that are accessible globally, to be used in any expression. Objects may have member variables, functions or both. The members of an object can only be retrieved (read), except for the var and prop objects. Use the set or default command to change member variables of prop and var. Here is the list of the global objects:

| Object | Purpose |
| --- | --- |
| Init | Access initialization parameters of BrowZ Script |
| Open | Access the results of a named statement |
| Prop | Access variables stored in the BZScript.properties file |
| Row | Access the fields; or columns of the current open statement |
| Session | Access the variables associated with a user's session |
| Var | Access HTTP POST and URL input, and temporary variables |

3.5.1 Init Object

The init object allows you to access the servlet initialization parameters. These are dependent upon how you initialized the BrowZ Script servlet with your web server. Any parameters you initialized your servlet with may be read, but you may not set the value of members of this object.

Examples

| | |
| --- | --- |
| init.user | Returns the value assigned to user |
| init.user.id | Returns the value assigned to user.id |

3.52 Open Object

The open object allows you to access result sets for those SQL statements that you gave names to in your script. If the statement has a result set you may access the columns by name or number, with 1 referring to the first column. If the statement does not have a result set, you may only retrieve the number of rows affected. This object is not normally needed because you may access statements by name alone. The time this object is needed is if you name a statement same as one of the other global objects. You may not set the value of members of this object, only read them. See section 3.1.1 for information on giving a statement a name.

Examples

| | |
| --- | --- |
| open.abc.user | Returns the value in column user from statement named abc |
| abc.user | Same as above |
| open.def.2 | Returns the value in column 2 from the statement named def |
| def.2 | Same as above |
| open.ghi | Returns the number of the current row from the statement named ghi, if the statement returns a result set, i.e. select |
| open.ghi | Returns the number of rows affected from the statement named ghi, if the statement does not return a result set, i.e. insert, update, or delete |
| ghi | Same as the above two examples |

3.5.3 Prop Object

The prop object allows you to access variables in the BZScript.properties files. You may not set the value of members of this object, only read the values that you placed in the properties file. See section 2.0 for information on the purpose of this file.

Examples

| | |
| --- | --- |
| prop.databases | Returns the value of the databases parameter |
| prop abc | Returns the value of the abc parameter |
| prop.abc.jkl | Returns the value of the abc.jkl parameter |

3.5.4 Row Object

The row object allows you to access result sets for the current open SQL statement. If the statement has a result set you may access the columns by name or number, with 1 referring to the first column. If the statement does not have a result set, you may only retrieve the number of rows affected. You may not set the value of members of this object, only read them.

Examples

| | |
| --- | --- |
| row.user | Returns the value in column user from the current open statement |
| row.2 | Returns the value in column 2 from the current open statement |
| row | Returns the number of the current row from the current open statement, if the statement returns a result set, i.e. select |

| | |
|---|---|
| row | Returns the number of rows affected from the current open statement, if the statement does not return a result set, i.e. insert, update, or delete |

3.5.5 Session Object

The session object allows access to variables associated with a user session. A new session with no member variables is created each time a new user requests a web page from BrowZ Script. The session stays alive as long as the same user continues to hit the server with the same browser. If the user exits the browser and launches it again a new session will be created, with no initial variables. These variables may be both read and written. This is where you would normally put variables that need to be passed between and among multiple scripts, but not among more than one user. If you need more permanent or persistent variables you should use records in your database.

Examples

| | |
|---|---|
| session.user | Access the variable called user associated with the user's session |
| session.name | Access the variable called name associated with the user's session |

3.5.6 Var Object

The var object is the most used object in BrowZ Script. It allows access to input variables from a form POST or URL parameter. You do not need to distinguish between a form input variables and URL variables, as only one type is allowed at a time. An HTTP POST only returns form input variables and an HTTP GET only returns URL variables, variables passed after the question mark in a URL. These variables may be both read and written, and you may create and use more variables than were initially passed to the script. This is where you would normally put all temporary script variables.

Examples

| | |
|---|---|
| var.user | Access the variable called user |
| var.name | Access the variable called name |

3.6 Global Functions

There are many functions that can be accessed globally, i.e. without using an object to access them. Below is a summary.

| Category | Function | Purpose |
|---|---|---|
| Boolean | And | Boolean and |
| | Not | Boolean negation |
| | Or | Boolean or |
| Conditional | Eq | Equality comparison |
| | Ge | Greater than or equal to comparison |
| | Gt | Greater than comparison |
| | If | Conditional, switched result |
| | Le | Less than or equal to comparison |
| | Lt | Less than comparison |
| | Ne | Not equal comparison |
| Conversion | Date | Date conversion |

| Category | Function | Purpose |
|---|---|---|
| | Int | Integer conversion |
| Math | Add | Addition |
| | Div | Division |
| | Mul | Multiplication |
| | Mod | Modulus, remainder |
| | Sub | Subtraction |
| Query | IsDate | Date checking |
| | IsNull | Null checking |
| String | Concat | String concatenation |
| | Html | HTML conversion |
| | IndexOf | Finds sub-string within string |
| | Length | String length |
| | Limit | String truncation |
| | LowerCase | Lower case conversion |
| | Quote | Quotes strings for SQL |
| | Strip | HTML tag stripping |
| | UpperCase | Upper case conversion |
| | Url | Conversion for URLs |
| Time | Now | Returns the current time |
| | Today | Returns the current date |

3.6.1 Add Function add(p1 . . . )_int

The add function returns the sum of all its parameters. Each parameter is converted to an integer before it is added. In the future support for other types will be included, such as float, date, time, etc.

3.6.2 And Function and(p1 . . . )_boolean

The and function returns the boolean and of all its parameters. Each parameter converted to a boolean before its used.

3.6.3 Concat Function concat(p1 . . . )_string

The concat function returns the string concatenation of the all parameters. Each parameter is converted to a string before it is used.

3.6.4 Date Function date([type,]p1)_object

The date function returns either a string or an int, given various types of input data, and possibly a type parameter. If the type parameter is not specified then "short" is assumed.

Long

Returns a string formatted as follows: Weekday, Month dd, yyyy.

Short

Returns a string formatted as follows: yyyy-mm-dd.

Sql

Returns a string for use in an SQL statement formatted as follows: {d 'yyyy-mmm-dd'}. This variation is required for all SQL insert or update statements where the field type is a date or date/time.

3.6.5 Div Function div(p1, p2 . . . )_int

The div function returns the quotient of p1 divided by p2. If there are more parameters each is divided into the quotient. Each parameter is converted to an integer before it is used.

3.6.6 Eq Function eq(p1, p2)_boolean

The eq function returns true if the two parameters are the same. A good attempt is made to convert the second parameter to the same type as the first before comparison.

1 3.6.7 Ge Function ge(p1, p2)_boolean

The ge function returns true if p1>=p2. A good attempt is made to convert the second parameter to the same type as the first before comparison.

3.6.8 Gt Function ge(p1, p2)__boolean

The ge function returns true if p1>p2. A good attempt is made to convert the second parameter to the same type as the first before comparison.

3.6.9 HtmI Function html([noTags,] p1)__string

The html function converts the to HTML format. Its does this by looking for certain characters and converting them to the proper HTML tags. If noTags is specified then it is assumed that the input text contains no HTML, so anything resembling HTML is fixed. You will probably use this function heavily for scripts designed for the web, unless you store HTML directly in your database. Here are the conversions that take place within this function:

| From | To | Conditions and Comments |
|---|---|---|
| \r, \n, or \r\n | <br> | |
| \t |      | |
| <sp><sp> . . . |   . . . <sp> | <sp> means a space character |
| < | < | If no Tags is specified |
| > | > | If no Tags is specified |
| & | & | |
| ; | ; | |
| * | <ul><li> | Unordered list; must begin a line |
| ** . . . | <ul><ul><li> | Higher level lists; must begin a line |
| # | <ol><li> | Ordered list; must begin a line |
| ## . . . | <ol><ol><li> | Higher level lists; must begin a line |
| ^ | <blockquote> | Indented block |
| ^^ . . . | <blockquote><blockquote> | Higher level indents; must begin a line |
| (c) | © | © |
| (r) | ® | ® |
| (tm) | <small><sup>TM</sup></small> | TM |
| (sm) | <small><sup>SM</sup></small> | SM |

3.6.10 If Function if(p1, p2, p3)__boolean

The if function converts p1 to a boolean and returns p2 if p1 evaluates to true, or p3 otherwise.

3.6.11 IndexOf Function indexOf(p1, p2)__int

The indexOf function returns the index of the p2 if found within p1. Both parameters are converted to strings before they are used. If p2 is not found within p1 then −1 is returned.

3.6.12 Int Function int(p1[, p2, p3])__int

The int function converts p1 to an integer. If p2 and p3 are specified then p1 will be range checked. If p1 is below p2 then the result will be p2. If p1 is above p3 then the result will be p3.

3.6.13 IsDate Function isDate(p1)__boolean

The isDate function returns true if p1 is or can be converted to a date.

3.6.14 IsNull Function isNull(p1)__boolean

The isNull function returns true if p1 is null.

3.6.15 Le Function le(p1, p2)__boolean

The le function returns true if p1<=p2. A good attempt is made to convert the second parameter to the same type as the first before comparison.

3.6.16 Length Function length(p1)__int

The length function returns the length of p1. P1 is converted to a string before it is used.

3.6.17 Limit Function limit(p1, p2)__string

The limit function returns the truncation of the p1 if its length is greater than p2. P1 is converted to a string and p2 is converted to an int before they are used.

3.6.18 LowerCase Function lowerCase(p1)__string

The lowerCase function converts all characters of p1 to lower case and returns it.

3.6.19 Lt Function lt(p1, p2)__boolean

The lt function returns true if p1<p2. A good attempt is made to convert the second parameter to the same type as the first before comparison.

3.6.20 Mod Function mod(p1, p2 . . . )__int

The mod function returns the remainder of p1 divided by p2. If there are more parameters each is divided into the previous remainder resulting in new remainder. Each parameter is converted to an integer before it is used.

3.6.21 Mul Function mul(p1 . . . )__int

The mul function returns the product of all the parameters. Each parameter is converted to an integer before it is used.

3.6.22 Ne Function ne(p1, p2)__boolean

The ne function returns true if the two parameters are not the same. A good attempt is made to convert the second parameter to the same type as the first before comparison.

3.6.23 Not Function not(p1)__boolean

The not function returns the boolean negation of p1. P1 in converted to a boolean before its used.

3.6.24 Now Function now( )__time

The now function returns the current time of day.

3.6.25 Or Function or(p1 . . . )__boolean

The or function returns the boolean or of all its parameters. Each parameter converted to a boolean before it's used.

3.6.26 Quote Function
quote(p1)__string

The quote function returns p1 as a string with single quotes around it, or the word NULL if p1 is null.

3.6.27 Strip Function
strip(links, p1)__string

The strip function returns p1 with all hyperlinks URLs, domain names and image tags removed from it. P1 is converted to a string before it is used.

3.6.28 Sub Function
sub(p1, p2 . . . )__boolean

The sub function subtracts all other parameters from p1 and returns the result. Each parameter converted to an int before it's used.

3.6.29 Today Function
today( )__date

The today function returns the current date.

3.6.30 UpperCase Function
upperCase(p1)__string

The upperCase function converts all characters of p1 to upper case and returns it.

3.6.31 UrI Function
url(p1)__string

The url function formats p1 as a string with characters that are not allowed in a URL converted to %hex. Use this when you need to put a field value into an HTML URL.

xor(a, b), neg(a)

These functions will take the place of in-line operators, which I'm also planning to add, eventually. They will return int, float, or boolean results based on their input parameters.

time([<time format>,]<value>)

The time function returns the current time as a formatted string, or an integer in a few cases. The variation you choose specifies what the result will look like.

short: 2:32 PM (This is the default)
medium: 2:32:15 PM
long: 2:32:15 PM MDT
hour: 2 (integer)
hour24: 14 (integer)
minute: 32 (integer)
second: 15 (integer)
ampm: PM
sqI: {t '14:32:15'}
float(data, [digits])__float This function converts the data to a floating point number. If you specify another parameter then the number will be truncated to that number of digits after the decimal point.

quotes(string)__string

This is the same a quote but it returns its parameter in double quotes, " ".

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer system comprising one or more server computers, said one or more server computers comprising a display portion, a central processing unit portion, an input portion, an output portion, and one or more memory portions, wherein said one or more memory portions of said one or more server computers comprising:

software for loading a mixed-format script file, said mixed-format script file containing HTML scripts and non-HTML script commands, wherein said software for loading said mixed-format script file is capable of loading a HTML file;

software for designating specific tags within said mixed-format script file, wherein said software for designating allows for inclusion of a stripping tag which corresponds to a HTML tag pair; and software for stripping script associated with said designated tags from said mixed-format script file, wherein said software for stripping strips designated HTML tags from said mixed-format script file, wherein said software for stripping strips designated HTML tags and any additional script between said designated HTML tags from said mixed-format script file, wherein said software for stripping removes said HTML tag pair and removes associated script which is associated with said HTML tag pair when said mixed-format script file is interpreted, and wherein said designated tags are replaced dynamically upon a command execution when said mixed-format script file is requested by a browser and executed by said one or more server computers.

* * * * *